May 28, 1940. B. BARÉNYI 2,202,615
RUBBER SPRINGING FOR MOTOR VEHICLES
Filed July 15, 1936 5 Sheets-Sheet 1
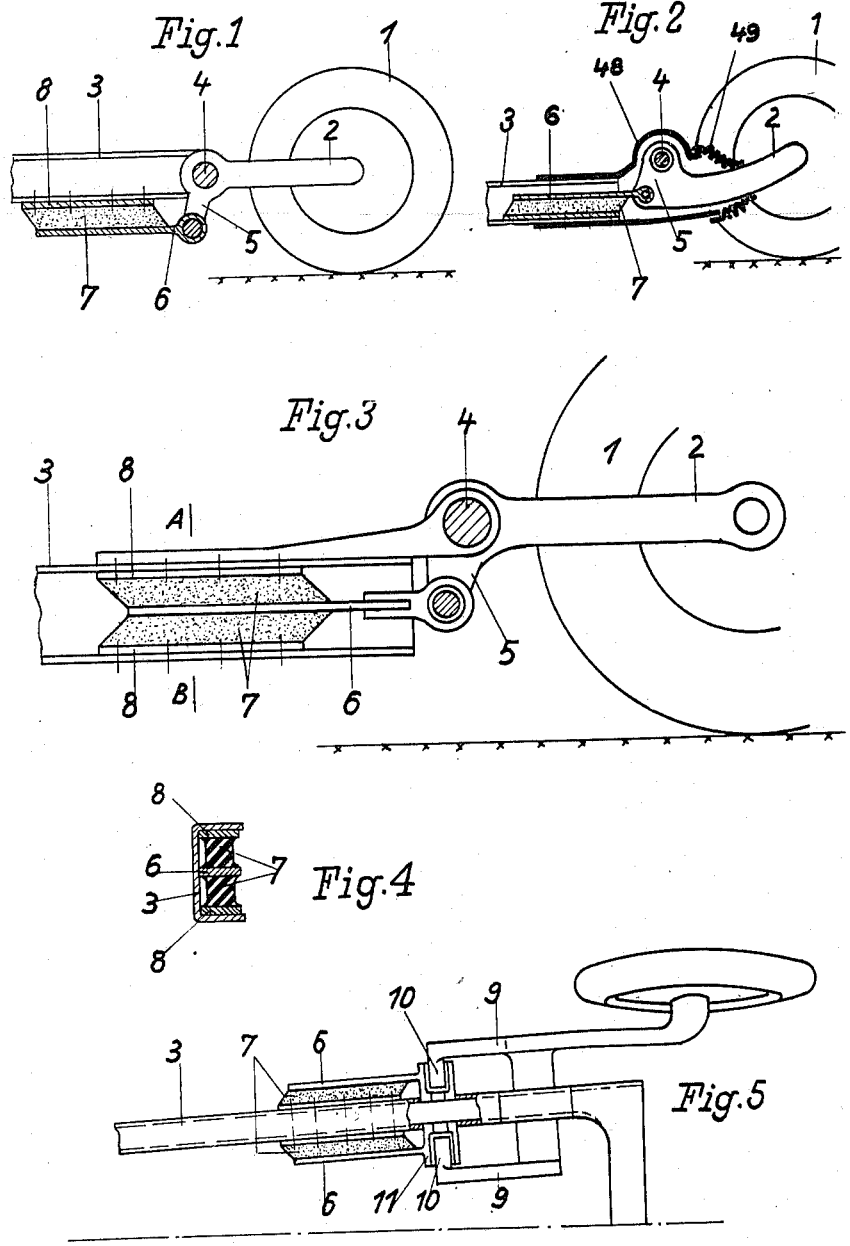
Inventor:
Bela Barényi May 28, 1940. B. BARÉNYI 2,202,615
RUBBER SPRINGING FOR MOTOR VEHICLES
Filed July 15, 1936 5 Sheets-Sheet 2

Inventor:
Bela Barényi
by Kurt H. Feist
his Attorney

May 28, 1940.　　　B. BARÉNYI　　　2,202,615
RUBBER SPRINGING FOR MOTOR VEHICLES
Filed July 15, 1936　　　5 Sheets-Sheet 3
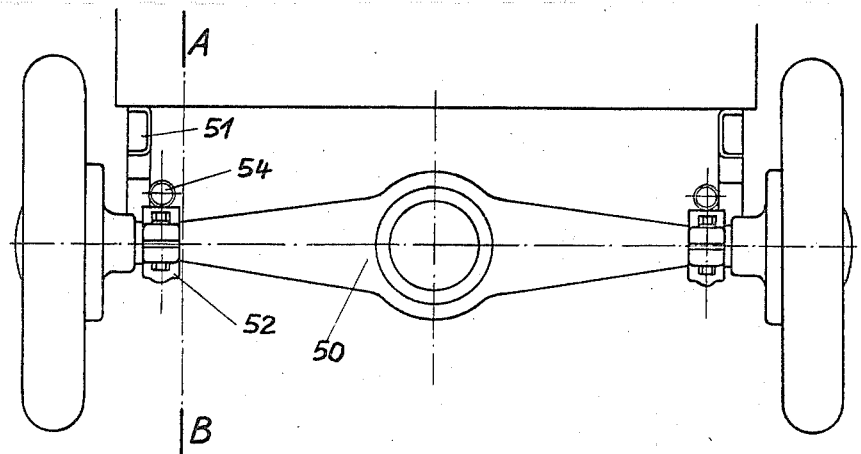
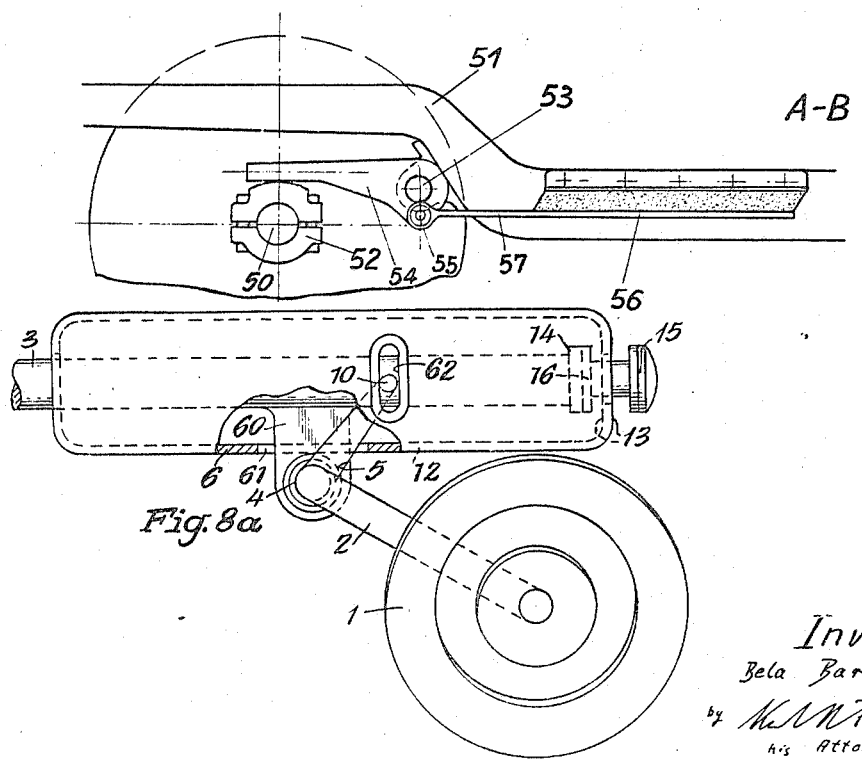
Inventor:
Bela Barényi

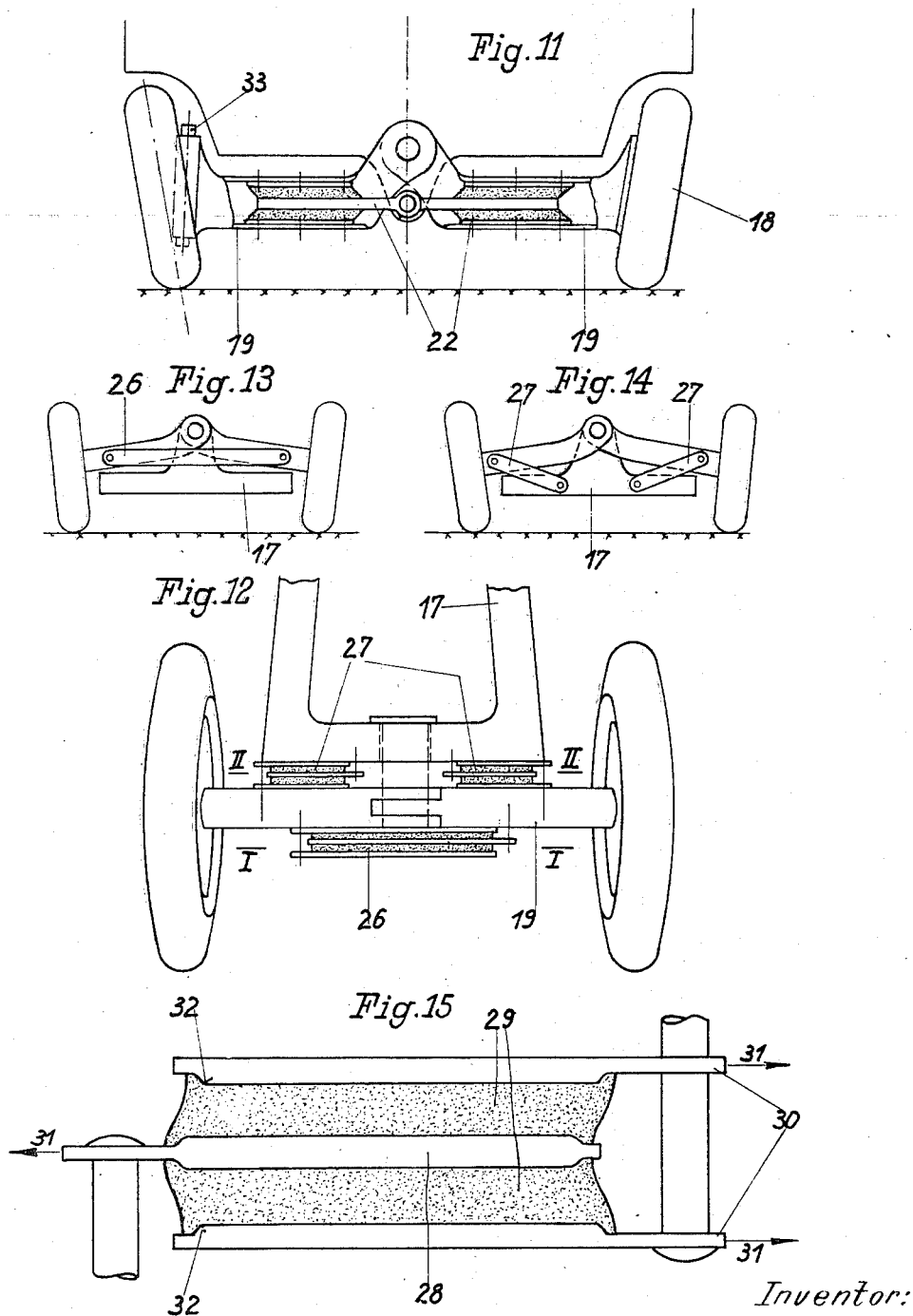

May 28, 1940.  B. BARÉNYI  2,202,615
RUBBER SPRINGING FOR MOTOR VEHICLES
Filed July 15, 1936   5 Sheets-Sheet 5
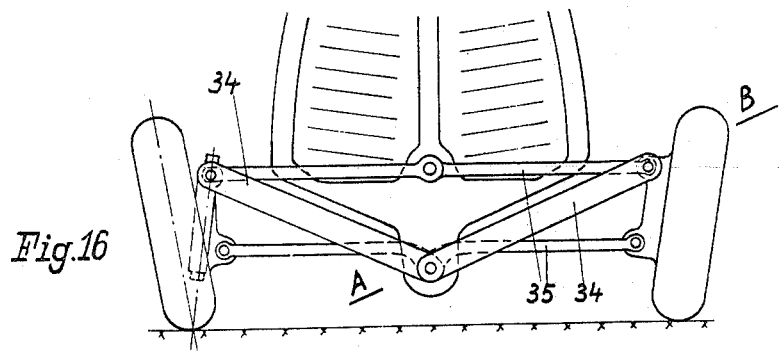
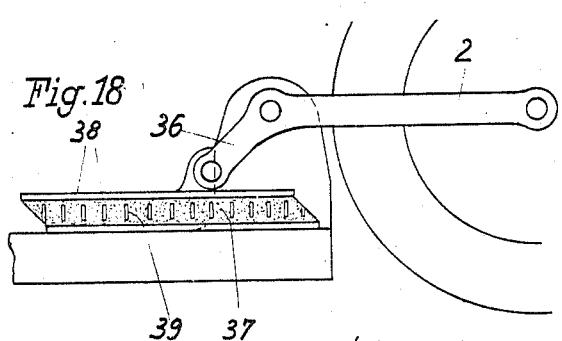
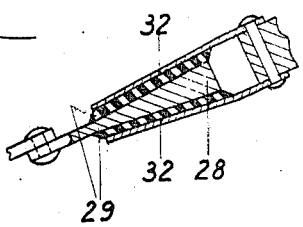
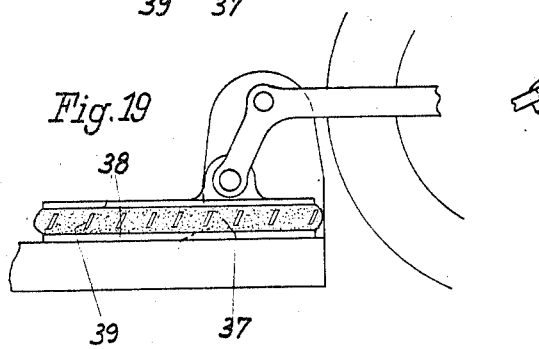
Inventor:
Bela Barényi
by Kurt H. Feist
his Attorney Patented May 28, 1940

2,202,615

UNITED STATES PATENT OFFICE 2,202,615

RUBBER SPRINGING FOR MOTOR VEHICLES

Béla Barényi, Paris, France, assignor to the firm Getefo, Gesellschaft für technischen Fortschritt m. b. H., Berlin, Germany, a German company Application July 15, 1936, Serial No. 90,631
In Germany July 16, 1935

13 Claims. (Cl. 267—21)

This invention relates to rubber springing for motor vehicles.

In known rubber suspension systems for motor vehicles the rubber material has been either subjected to tensile stress, in which case the danger of destruction of the stressed rubber is great, or, if the wheels are mounted on rocking levers, the rubber has been given the form of a ring or disc, as a result of which the rubber material was spirally deformed. In these devices the fixing of the rubber parts to the surfaces in contact therewith is complicated, and it is difficult to accommodate the elements required for the springing in a suitable manner in the space conveniently available in the design of the vehicle, while still achieving the desired resiliency and ability to take the load. In addition, the rubber material is not stressed uniformly throughout and its springing properties are therefore only incompletely utilised.

The present invention contemplates a rubber springing device in which the rubber material is also fixed between surfaces and is subjected to shearing stress. A uniform stressing of the rubber, and a springing device adaptable to all requirements are however obtained by the features that the parts adhesively connected to the rubber act upon the axles, rocking levers or guide arms carrying the wheels to be sprung, through a system of rods or levers which provide a transmission ratio.

By virtue of this construction it is possible to give the rubber the form of a layer limited by plane surfaces, and with this single element, to obtain the necessary ability to take the permissible specific load, the length and width of said element defining the transmissible forces and the thickness defining the resiliency of the springing. Constructional adaptability to given circumstances is possible in the case of the space being limited in one direction, by extending the springing in the other direction, or by multiplying the layers. In consequence of the plane limiting surfaces it is possible to shift the adhesive surfaces which transmit the force by equal distances throughout, so that all the rubber sections are equally stressed throughout and no part is liable to a premature overstressing. This results in a greater safety factor, so that it is possible to go safely up to the calculable maximum values of the specific stressability.

In detail, the arrangement of the rubber layers can be carried out kinematically in different ways. They can act through tensile elements upon rocking levers or they can also be mounted directly on guide arms or axles. Gear wheels, spindle pinions and other kinematic devices can also be used as gearing transmitting the force from the wheels, axles or rocking levers to the tensile elements fixed to the rubber. The device can for instance also be arranged in such a way that the rubber layer is stressed through several superposed movements of the tensile elements, that is to say, for example, subjected to combinations of shearing and compressive stress, or shearing or torsional stress, or shearing and tensile stress. Moreover it is easily possible to alter the path of deformation of the spring by altering the transmission ratio between the tensile elements acting upon the rubber and the axles or rocking levers, for instance by pivoting the rocking levers eccentrically, or in similar fashion, and thus to adapt the action of the spring to the load and to the road conditions.

In order more clearly to understand the invention, reference is made to the accompanying drawings, which illustrate diagrammatically and by way of example various embodiments thereof and in which:

Fig. 1 shows an arrangement of the suspension below the frame,

Fig. 2 shows an arrangement of the suspension within the profile of the frame,

Figure 6:
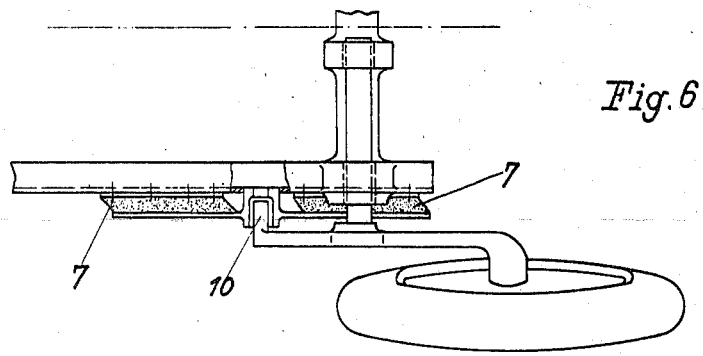
Figure 7:
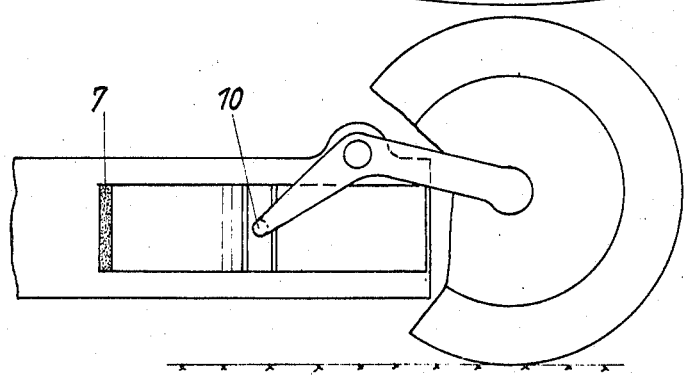
Figures 9, 10:
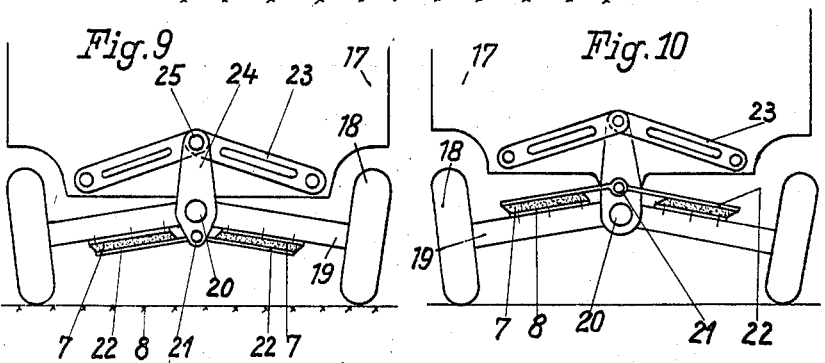
Figure 8:
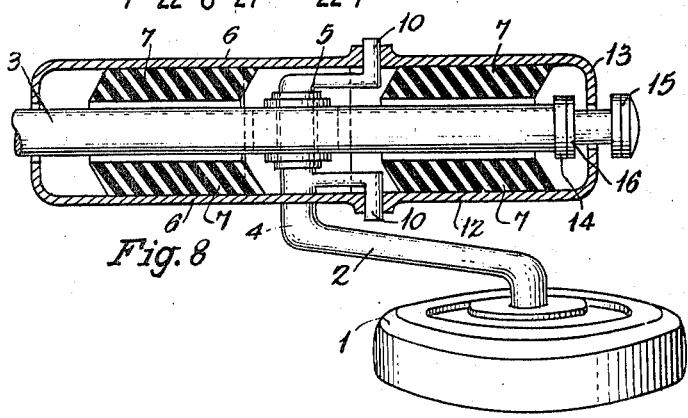

Figs. 3 and 4 are a side-elevation and a cross-section respectively of an arrangement comprising several spring layers, Fig. 5 shows a twin arrangement of the suspension, Figs. 6 and 7 are a plan and a side elevation respectively of an arrangement dealing with lateral sliding, Fig. 8 shows an arrangement with limited deflection of the spring, Fig. 8a is a side elevational view of the device shown in Fig. 8, Fig. 9 shows an arrangement of the suspension for rocking, transverse half-axles, Fig. 10 shows a modification of the arrangement of Fig. 9, Fig. 11 shows an arrangement for driven axles, on the left-hand side for the steered wheels and on the right-hand side for the trailing wheels, Figs. 12 to 14 show a further constructional form with transverse axles, in plan-view and in two cross-sections through the lines I—I and II—II respectively, Fig. 15 is a plan of a form of construction of the spring, on a larger scale, Fig. 16 shows an arrangement of diagonal springs where the wheels are guided parallel, Fig. 17 is a section through the spring along the lines A—B of Fig. 16, Figs. 18 and 19 show a spring subjected to shearing and compressive stress simultaneously, in Fig. 18 in the slightly stressed state, in Fig. 19 in the highly stressed state.

Fig. 20 is a longitudinal section of a further form of construction of a spring subjected to shearing and compressive stress, Fig. 21 is a view of a rigid axle with a spring subjected to shearing stress, and Fig. 22 is a vertical section along the line A—B of Fig. 21.

In the embodiment shown in Fig. 1, a wheel 1 is mounted on a lever 2, which is pivoted to a frame 3 by an axle 4, and to the arm 5 bell-cranked thereto. On the left-hand side of the lever 2 is pivoted a tensile element 6 which is connected to a rubber spring 7 by adhesion. Said rubber spring 7 is connected on its other side to the frame tube 3 by means of a metal plate 8 to which it is also fixed by adhesion. The load of the vehicle which is transmitted to the ground by the wheel 1 exerts a tensile stress on the element 6, which is taken up by the shearing stress of the rubber spring 7, the strength and resiliency of which determines the springing characteristic, taking into consideration the ratio of the length of the lever arms 2 and 5.

In the embodiment shown in Fig. 2, which in principle is the same as that of Fig. 1, the rubber layer 7 is arranged within the frame profile 3, which results in a protected position of the springing element and in a greater clearance above the road surface, or a lower position of the centre of gravity of the vehicle.

The pivot point of the rocking lever is surrounded by a rigid casing 48 which is continued by a sleeve 49 enclosing the rocking lever 2. The tensile element 6 can be made resilient or take the form of a flexible leaf spring so that it follows the deflections of the arm 5, which latter is suitably incorporated in the rocking lever 2.

In the embodiment shown in Figs. 3 and 4, the tensile element is enclosed in and adhesively secured to two rubber layers 7, symmetrically arranged with respect to each other and if desired also of different thicknesses or lengths. The rubber layers 7 are in turn fixed to the two flanges of the frame girder by means of the metal plate 8.

In the embodiment shown in Fig. 5 a spring element 7 is arranged on both sides of the frame profile 3. These elements act symmetrically on a pair of levers 9, the pins 10 which slide in the sleeves 11 joined to the tensile members 6 in such a way that alterations in the thickness of the rubber layers 7, when they are moved axially, are balanced.

In the arrangement shown in Fig. 6, unilateral stresses in the longitudinal direction are balanced by the symmetrical arrangement of several resilient members 7 on both sides of the pin 10. In this arrangement also it is possible to use the double lever 9 shown in Fig. 5, and thus there is obtained a division into four resilient members symmetrically disposed with respect to each other. In the obtuse-angled formation of the bell crank lever, as shown in Fig. 7, provision is made for the pins 10 to be able to slide vertically. This arrangement gives a desirable steepness of the spring characteristic in the sense that with a heavy load the spring becomes considerably harder than in the case of a light load.

In the embodiment shown in Figs. 8 and 8a the tensile element 12 is at the same time formed into a protective cap or bell, and in addition serves at its end 13 as a stop in conjunction with the impact buffers 14 and 15, which are fitted with rubber layers 16 to take the force of the impact. The impact buffers 14 and 15 are mounted on the frame 3 of the vehicle. Said frame 3 carries a bracket 60 extending through a slot 61 of the cap or casing 12 slidably arranged on the frame 3. The portion 4 of the bell-crank lever 2, 5 carrying the wheel 1 is journalled in a bearing arranged on the bracket 60. The pins 10 mounted on the arms 5 of the bell-crank lever are in slidable engagement with slots 62 of the cap 12. Figs. 8 and 8a illustrate a symmetrical arrangement of four rubber blocks 7, each of said blocks being secured between the cap 12 and the frame 3.

The application of the suspension system of the present invention to vehicles with transverse rocking half-axles will hereinafter be described.

In the arrangement shown in Fig. 9 the half-axles 19 carrying the car wheels 18 are pivoted on the car body 17 in such a way as to rock on a longitudinal axle 20. The longitudinal axle 20, which can for example be the middle longitudinal girder or else a body frame, carries tensile members 22, likewise pivoted, at 21, in the middle longitudinal frame, to which the spring elements 7 are in their turn joined by adhesion, while said spring elements 7 are on the other side secured by adhesion to the metal plate 8 which is joined to the half-axles 19. The stabilisation of the car body 17 is effected by special stabilisation springs 23, which are also pivoted, at 25, in the middle longitudinal plane.

The embodiment in Fig. 10 agrees in principle with that shown in Fig. 9, the point of pivoting 21 of the tensile members 22 being merely moved above the pivot point 20. This arrangement avoids the restriction of the clearance above road surface through the spring elements, but gives rise to a greater inclination of the car body on curves.

In Fig. 11 a similar arrangement of the spring element to that described with reference to Figs. 9 and 10, applied to transverse tensile members 22, is shown, the whole suspension system being placed inside the half-axle. By making the tensile members 22 hollow it is possible to pass the driving shafts also through the hollow thus created. This arrangement is, as shown on the left-hand side of the figure, applicable to wheels turning on a steering swivel journal 33 in the same way as to the unsteered wheels 18 shown on the right-hand side.

In the arrangement shown in Figs. 12 to 14 spring devices are fitted which act as tension springs, the pivot point of the half-axles 19 being moved into the neighbourhood of the plane of the centre of gravity of the car body. One of these spring devices is the main spring 26 taking the vertical load, and the others are stabilisation springs 27 taking the unequal loads, these latter being arranged on both sides of the axle 19.

Fig. 15 shows a plan-view of a constructional form, given by way of example of such a spring element acting purely as a tensile spring. In this arrangement a middle tensile element 28 is disposed between rubber layers 29, which are for their part secured to the outer tensile elements 30. If the tensile stress acts in the direction shown by the arrow 31, the rubber layers are deformed in the manner shown. In order then to lessen the notch effect at the most endangered edges, the rubber layers 29 are so constricted by pressure pieces 32 provided on the metal plates 28 and 30, that even in the lateral distortion the end fibres of the rubber material follow a gently curved path in streamline fashion. The spring element depicted fulfils all the functions of a tensile spring, and in addition acts with the same characteristic in both directions, that is to say in the capacity of a compression spring also. The capacity to transmit forces can be multiplied by multiplying the rubber layers and tensile members placed side by side, and also by increasing the area of the tensile members. The element is therefore particularly widely usable and adaptable.

In the arrangement shown in Fig. 16 tension springs corresponding to the elements in Fig. 15 are provided as diagonal springs 34 between the parallelogram track rods 35. In this case the spring elements on one or both tensile members 28 or 32, as shown in section in Fig. 17, can be made so oblique or wedge-shaped that on applying a tensile stress, the rubber parts 29 are subjected not only to shearing but also to compressive stress.

The same kind of stressing is also possible, as shown in Fig. 18, with the lever guides 2 running in the direction of travel in accordance with Figs. 1 to 8, an obtuse-angled lever arm 36 being fitted. When the spring is in the slightly stressed or completely unstressed state shown in Fig. 18, the fibres of the rubber part 37 move obliquely between the metal plates 38 which are mounted in parallelogram form. The latter form is so chosen that in the loaded state shown in Fig. 19 the plates lie exactly opposite each other, so that the rubber part 37 is subjected both to shearing and to compressive stress, as is shown by indicating the fibres as lines 39.

The tensile element in Fig. 20 has annular rubber elements 40, which are secured by adhesion between obliquely set metal rings 41 and 42. The inner rings 42 are mounted on a shaft or a tensile member 43, while the outer rings 41 are held inside a tube 44 or by the tension ring 45. In the case of tensile stress in the direction of the arrows 46 the rubber rings 40 are, in consequence of the oblique mounting of the rings 41 and 42, subjected both to shearing and to compressive stress. The zig-zag shaped end surfaces of the rings 40, shown at 47, serve to relieve the rubber parts most stressed by notch effect.

In Figs. 21 and 22 a rigid axle is shown, which is fitted with the springing according to the invention. The rigid axle 50, which transmits the wheel shear to the frame 51 through shear elements not depicted in the drawings, is mounted at both ends in bearings 52, which are supported against the bell-crank lever 54 pivoted on the frame 51 by the pin 55. The running impacts are transmitted to the rubber spring 56 with the aid of the pin 55 secured to the bell-crank lever 54 and of the tensile member 57 secured by adhesion to the rubber spring 56.

The details shown by way of example in the various figures are interchangeable, and the various springing elements can be used in conjunction with the most diverse wheel suspension systems.

Having now particularly described and ascertained the nature of our said invention and in what manner the same is to be performed, I declare that what I claim is:

1. A springing element for connecting wheel axles with a vehicle, comprising at least two metal plates, a rubber block adhesively secured between said metal plates, a connection between one metal plate and the vehicle body and between another metal plate and a wheel axle, and means positively causing a substantially parallel movement of said metal plates relative to each other, said metal plates subjecting said rubber block to shearing stress due to the load of the vehicle and road shocks uniformly and in the same direction at all points of said adhesively secured surfaces.

2. A springing element for connecting wheel axles with a vehicle, comprising at least two metal plates, a rubber block adhesively secured between said metal plates, members connecting one metal plate with the vehicle body and another metal plate with a wheel axle, and means positively causing a substantially parallel movement of said metal plates relative to each other, said metal plates subjecting said rubber block to shearing stress due to the load of the vehicle and road shocks uniformly and in the same direction at all points of said adhesively secured surfaces.

3. A springing element for connecting wheel axles with a vehicle, comprising at least four metal plates two of same being symmetrically disposed with respect to each other, at least one rubber block adhesively secured between two of said metal plates, members connecting two of said metal plates with the vehicle body and the two other metal plates with a wheel axle, and means positively causing a substantially parallel movement of said metal plates relative to each other, said metal plates subjecting said rubber block to shearing stress due to the load of the vehicle and road shocks uniformly and in the same direction at all points of said adhesively secured surfaces.

4. A springing element for connecting wheel axles with a vehicle, comprising more than two metal plates symmetrically disposed with respect to each other, at least two rubber blocks arranged between said metal plates and adhesively secured to said metal plates, at least one metal plate being disposed between said two rubber blocks and adhesively secured thereto, members connecting one metal plate with the vehicle body and another metal plate with a wheel axle, and means positively causing a substantially parallel movement of said metal plates relative to each other, said metal plates subjecting said rubber block to shearing stress due to the load of the vehicle and road shocks uniformly and in the same direction at all points of said adhesively secured surfaces.

5. A springing element for connecting wheel axles with a vehicle, comprising at least two metal plates, a rubber block adhesively secured between said metal plates, a connection between one metal plate and the vehicle body, and a pivoted member connecting another metal plate with a wheel axle and positively causing a substantially parallel movement of said metal plates relative to each other, said metal plates subjecting said rubber block to shearing stress due to the load of the vehicle and road shocks uniformly and in the same direction at all points of said adhesively secured surfaces.

6. A springing element for connecting wheel axles with a vehicle, comprising at least two metal plates, a prismatic rubber block adhesively secured between said metal plates, a connection between one metal plate and the vehicle body, a pivoted member connecting another metal plate with a wheel axle and positively causing a parallel movement of said metal plates relative to each other, and a frame member housing said element, said metal plates subjecting said rubber block to shearing stress due to the load of the vehicle and road shocks uniformly and in the same direction at all points of said adhesively secured surfaces.

7. A springing element for connecting wheel axles with a vehicle, comprising at least two metal plates, a rubber block adhesively secured between said metal plates, a connection between one metal plate and the vehicle body, and an obtuse angled bell crank lever connecting another metal plate with a wheel axle and exerting a tensile stress thereon, said metal plates subjecting said rubber block to shearing stress due to the load of the vehicle and road shocks uniformly and in the same direction at all points of said adhesively secured surfaces.

8. A springing element for connecting wheel axles with a vehicle, comprising at least two metal plates, a rubber block adhesively secured between said metal plates, a connection between one metal plate and the vehicle body, an obtuse-angled bell-crank lever connecting another metal plate with a wheel axle and exerting a tensile strength thereon and means for limiting the deflection of said rubber block, said metal plates subjecting said rubber block to shearing stress due to the load of the vehicle and road shocks uniformly and in the same direction at all points of said adhesively secured surfaces.

9. A springing element for connecting wheel axles with a vehicle, comprising at least two metal plates, a rubber block adhesively secured between said metal plates, members connecting one metal plate with the vehicle body and another metal plate with a wheel axle, said metal plates being swingably mounted on pivots displaced with respect to each other subjecting said rubber block to shearing stress due to the load of the vehicle and road shocks uniformly and in the same direction at all points of said adhesively secured surfaces.

10. A springing element for connecting wheel axles with a vehicle, comprising at least two metal plates, a rubber block adhesively secured between said metal plates, members connecting one metal plate with the vehicle body and another metal plate with a wheel axle, said metal plates being swingably mounted on pivots displaced with respect to each other and together with the rubber block being mounted in the interior of an oscillating axle such that said metal plates subject said rubber block to shearing stress due to the load of the vehicle and road shocks uniformly and in the same direction at all points of said adhesively secured surfaces.

11. A springing element for connecting wheel axles with a vehicle, comprising at least two metal plates, a tapering rubber block adhesively secured between said metal plates, members connecting one metal plate with the vehicle body and another metal plate with a wheel axle, said metal plates being arranged obliquely to the direction of the stress applied thereto and subjecting said rubber block simultaneously to shearing stress and to pressure due to the load of the vehicle and road shocks uniformly and in the same direction at all points of said adhesively secured surfaces.

12. A springing arrangement for an independently sprung vehicle wheel comprising in combination with the vehicle frame, a rotatably mounted link carried by the frame for guiding the wheel, a pair of plate members, one of said plates being secured to said link, the other of said plates being pivotally mounted on said frame and extending therefrom in a substantially parallel relation with respect to said link, said plates being adapted to move in the swinging plane of the wheel, a relatively hard rubber member interposed between and secured to the surfaces of said plate, whereby the shearing resistance of said rubber member opposes the springing of the wheel.

13. A springing arrangement for an independently sprung vehicle wheel comprising in combination with the vehicle frame, a rotatably mounted link carried by the frame for guiding the wheel, a pair of plate members, one of said plates being secured to said link, the other of said plates being pivotally mounted on said frame and extending therefrom in a substantially parallel relation with respect to said link, said plates being adapted to move in the swinging plane of the wheel, an elongated rubber member interposed between and secured to the surfaces of said plates whereby the shearing resistance of said rubber member opposes the springing of the wheel.

BÉLA BARÉNYI.